United States Patent [19]
Böhm et al.

[11] Patent Number: 6,067,139
[45] Date of Patent: May 23, 2000

[54] MULTI-DOMAIN STN LCD COMPRISING FLUORINATED POLYIMIDE ALIGNMENT LAYERS

[75] Inventors: Edgar Böhm, Taipai, Taiwan; Akio Osabe, Kanagawa Pref., Japan; Brian Auman, Newark; Melvin Zussman, Wilmington, both of Del.

[73] Assignee: E. I. du Pont de Nemours and Company, Wilmington, Del.

[21] Appl. No.: 09/104,043

[22] Filed: Jun. 25, 1998

[30] Foreign Application Priority Data

Jun. 26, 1997 [EP] European Pat. Off. ............. 97110453

[51] Int. Cl.[7] ........................ G02F 1/1337; C09K 19/56; C08G 69/26; D02G 3/00
[52] U.S. Cl. ..................... 349/123; 252/299.4; 528/353; 428/473.5
[58] Field of Search ................... 252/299.4; 349/123; 528/353; 428/373.5

[56] References Cited

U.S. PATENT DOCUMENTS

| Re. 34,885 | 3/1995 | Yokokura et al. ................. 252/299.01 |
| 5,029,987 | 7/1991 | Shinomiya et al. ......................... 359/1 |
| 5,129,727 | 7/1992 | Hanyu et al. ............................. 359/75 |
| 5,344,916 | 9/1994 | Harris et al. ............................ 528/353 |
| 5,480,964 | 1/1996 | Harris et al. ............................ 528/353 |
| 5,670,609 | 9/1997 | Auman et al. .......................... 528/353 |
| 5,759,442 | 6/1998 | Auman et al. ........................ 252/299.4 |
| 5,807,498 | 9/1998 | Gibbons et al. ...................... 252/299.4 |
| 5,856,431 | 1/1999 | Gibbons et al. ........................ 528/353 |

*Primary Examiner*—C. H. Kelly

[57] ABSTRACT

The present invention provides a STN LCD device having at least two domains per pixel, comprising:

a) a liquid crystal layer having opposite sides;

b) a set of electrodes on either side of said liquid crystal layer;

c) a fluorinated polyimide alignment film for aligning a liquid crystal layer.

16 Claims, No Drawings

MULTI-DOMAIN STN LCD COMPRISING FLUORINATED POLYIMIDE ALIGNMENT LAYERS

The present invention relates to a Super Twisted Nematic Liquid Crystal Display (STN LCD), having at least two domains per pixel (Multi-Domain STN LCDs), using a fluorinated polyimide alignment film which maintains a stable tilt angle under the conditions of the fabrication process of these STN LCDs.

BACKGROUND OF THE INVENTION

In a conventional form, a liquid crystal display (LCD) device consists of a liquid crystal layer with opposite sides, a set of electrodes (electrical conductors such as indium-tin-oxide, ITO) on either side of the liquid crystal layer and an alignment or orientation polymer layer between each set of electrodes and the liquid crystal layer.

Alignment of the liquid crystal molecules occurs along a preferred direction, e.g. introduced by rubbing of an orientation layer, and at a certain angle with respect to the plane of the inside of the two substrates, usually glass plates or plastic sheets, which support the electrodes. This latter angle is referred to as the tilt angle as disclosed by T. Uchida and H. Seki in *Liquid Crystals Applications and Uses,* B. Bahadur, ed., World Scientific, London, Vol. 3, 1992, pp 1–63; G. Baur et al. in *Physics Letters,* Vol. 56A, No. 2, 1976, pp. 142–144; T. J. Scheffer and J. Nehring in *J. Appl. Phys.* Vol. 48, No. 5, 1977, pp. 1783–1792.

The set of transparent electrodes are patterned, e.g. by etching, in a layout compatible with the information to be displayed by the LCD.

The alignment layer is applied onto the two glass plates or plastic sheets covered with ITO substrates, by solution casting, e.g. spin coating, roller coating, dipping, spraying, printing and/or doctor blading, of the appropriate polymer or its precursor. After removal of the solvents and/or curing of the polymer layers, the substrates are usually rubbed or buffed in one direction with cloths. The rubbing process serves to establish a unique optical direction. After rubbing both plates or sheets, they are rotated by a certain angle around the axis perpendicular to the main plane in order to establish the so called twist angle in the liquid crystal. In Super Twisted Nematic (STN) applications for liquid crystal displays the twist angle of the liquid crystal has a value preferably between 160 degrees and 360 degrees as disclosed by C.M. Waters et al. in *Proc. Soc. Inf. Displ.,* 3rd Intern. Display Conference, Kobe, Japan, New York, 1985; for STN-LCDs: Y. Kando, T. Nakagomi, S. Hasegawa, C. Mobara in German Offenlegungsschrift 3,503,259; for SBE-LCDs: T. J. Scheffer and J. Nehring in *Appl. Phys. Lett.* 45, 1984, p. 1021; for OMI-LCDs: M. Schadt and F. Lennhouts in *Appl. Phys. Lett.* 50, 1987, p. 236; for DST-LCDs: F. Jonas, R. Dhein in European Published Specification 0,236, 842; for BW-STN-LCDs: K. Kawasaki et al. in *SID 87 Digest,* 391, 20.6).

In order to establish a cell, the plates or sheets are adhered together e.g. using organic adhesives to preserve a constant thickness of the space or gap between the surfaces which may be achieved by the use of suitable spacers in the frame adhesive and/or over the whole display area. The cell is filled with a mixture of liquid crystal materials and finally sealed using e.g. organic adhesives. At this stage, polarizing films are often attached to the outside glass or plastic surfaces by a lamination process. In addition to polarizing films other optically active layers are frequently applied, such as compensation layers, $\lambda/4$ plates and brightness enhancement films. Finally, electrical connections are made to both plates or sheets in a manner consistent with the electrical and display designs.

A general problem of LCDs which is especially severe in the case of STN LCDs is their insufficient viewing angle. An effective method to improve this parameter is given by introduction of domains with different alignment directions into each addressed pixel of a liquid crystal display device, leading to so called Multi-Domain Displays.

For the sake of simplicity the closer explanation of this type of display is given in a simple modification, the Double-Domain LC-display, also called Duel-Domain LCD as disclosed by T. Yamamoto, Y. Morizumi, M. Okamoto, Y. Tanaka, N. Fukuoka, H. Hatoh in *J. SID,* 4/2, 1996, pp. 83–87; Z. Ma, K. Ma, H. Jing, S. Wu, X. Zhu, Y. Liang, J. Guo, J. Yuan, X. Huang in *SID 96 Digest,* 1996, pp. 658–661; J. Li, E. S. Lee, H. Vithana, P. J. Bos in *Jpn. J. Appl. Phys.,* Vol. 35, 1996, pp. 1446–1448. It is obvious that the following is valid for any larger number of domains.

Each of the substrate surfaces of a Double-Domain STN-cell, addressable through ITO electrodes, i.e. pixels are divided into two domains with alignment directions opposite to each other. The twist angle of each of the domains is in the same range used for standard STN-applications i.e. Single-Domain STN-LCDs (generally between 160 degrees and 360 degrees). Each of the domains in a Double-Domain LCD therefore can be regarded as a single cell displaying half of the given information with the same contrast but for mutually opposite viewing angles to the corresponding second domain.

Double-Domain STN-cells with perpendicular alignment directions of the domains have also been described, leading to an improved contrast for a different viewing angle.

The process serving to establish the two different domains is similar to conventional STN-fabrication processes where an alignment layer, such as a polyimide, is rubbed, as described above, to determine the alignment direction. In addition to this step, for Double-Domain STN LCDs a masking operation is performed e.g. by photolithography which as a result covers half of the pixel with a removable layer. This is followed by a second rubbing process. The second rubbing effects only the non-masked area and is performed in a predetermined direction differing from the first rubbing direction. After removing the mask with a solvent, an orientation layer with two areas of different alignment direction results. This process is carried out on both the top and the bottom surface of the cell, with rubbing directions altered correspondingly at least on one substrate, to achieve the twist angle of an STN-LCD. Upon assembly of the two substrates, the LCD is formed which has pixels with two domains in each pixel that mutually compensate each others dependence of the contrast on the viewing angle.

The use of rubbed polymer films, i.e. alignment direction and tilt angle controlling films, dominates the process technology used in the production of all categories of liquid crystal displays. Moreover, the tilt angle and its magnitude are most important in the various electro-optic display modes. The stability, legibility and reliability of the LCD are all related to the magnitude and stability of the tilt angle.

Polyimides are generally known as orientation layers in liquid-crystal displays and have proven successful due to their good optical and thermal properties. They are also employed, in particular, in STN-display elements.

Frame sealants used in the LCD are typically organic adhesives which are sealable by exposure to UV radiation or to elevated temperature. Commonly used temperature curable organic adhesives are set at a typical peak temperature of 150° C. to 200° C. for a curing time ranging from several minutes to several hours. The effect of alignment which is induced by the rubbing of the alignment layer has to withstand this temperature treatment as the sealant has to be cured after rubbing of the orientation layer.

In the production process of Multi-Domain LCDs the demand on the alignment layer is even higher than that of Single-Domain LCDs since an already rubbed layer with a certain alignment direction is subjected to a masking procedure and a second rubbing process with a different rubbing direction as described above. Thus, the alignment polymer layer and the alignment direction which directly effects the tilt angle being induced in a liquid crystal layer, need to be stable towards developing agents, such as hydroxides like tetramethylammoniumhydroxide, which are employed in the photolithographic process generating the mask. Furthermore, the polymer alignment layer and the alignment direction have to be stable towards contact with the mask and towards solvents, such as dialkylethers like diethylether or esters like butylacetate or ethylacetate which may be used in order to remove the mask from the alignment layer.

However, it is almost generally found in the production process of Multi-Domain LCD that the value of the tilt angle exhibit reductions of more than 10% compared to the tilt angle of any other domain of an observed pixel, after multiple rubbing, high curing temperatures and masking procedures have been applied to the alignment layer.

This difference in the tilt angle of the domains of a pixel can be explained by two major effects on the alignment layer, adding up during the manufacturing process of the Multi-Domain LCD. First, by rubbing an already rubbed alignment layer in a different direction the ability to orientate liquid crystals is usually weakened. Thus the tilt angle provided by such a double rubbed alignment layer decreases significantly, compared to the tilt angle obtained by the single rubbed alignment layer when using standard polyimides as orientation layers, under the same rubbing conditions and even under optimized rubbing conditions for the second rubbing.

Second, the value of the initial tilt angle decreases usually to a large extent by bringing an already rubbed alignment layer into contact with dialkylethers or esters and hydroxides during the masking procedure in the production of Multi-Domain LCDs. Usually in the Multi-Domain LCD production process one of the areas of the alignment layer establishing the domains of a pixel is rubbed once, therefore provides a high tilt angle and stays protected by the photolithographic mask till the end of the process, whereas the others are subjected 4; to the above conditions, exhibit a reduced tilt angle compared to this initial tilt angle and thus giving rise to the difference in tilt angle in the set of domains of a pixel after assembly of the cell.

In addition to these adverse effects it was also found that high temperatures which are employed in the curing process of temperature curable adhesives significantly decrease the value of the tilt angle provided by standard polyimide alignment layers.

Especially for Multi-Domain STN-applications, where larger tilt angles are required as disclosed by T. Scheffer in *Appl. Phys. Left.*, 45, 1984, pp. 1021–1023, the reduction of the tilt angle occurring in some of the domains of a pixel, leads to a significant loss of contrast and to an enhanced viewing angle dependence. This is even more noticeable in the case when multiplexed cells, as disclosed by T. Scheffer, J. Nehring in *Liquid Crystals Application and Uses*, B. Bahadur, ed., World Scientific, London, Vol. 1, 1990, are envisaged.

It was found that a tilt angle reduction larger than 10% between two domains of the pixel of a cell is already sufficient to have an adverse effect on the optical performance of the cell.

Therefore a need exists for polyimides that maintain the large tilt angle used for STN-applications or at least do not exhibit reductions of the tilt angle of more than 10% compared to the tilt angle of any other domain of the pixel, after multiple rubbing, high curing temperatures and masking procedures have been applied to the alignment layer in the fabrication process of Multi-Domain LCDs.

Several fluorine containing polyimides are known to be suitable as alignment layers for Single-Domain STN LCDs which provide moderate to high tilt angles.

For example, Japanese Kokai Patent No. 63(1988)-259515, published Oct. 26, 1988, Japanese Kokai Patent No. 1(1989)-180518 and No. 1(1989)-180519, published Jul. 18, 1989 and Japanese Kokai Patent No. 2(1990)4225, published Jan. 9, 1990, disclose polyimides as alignment layers for liquid crystal displays containing perfluoroalkyl groups, comprising the compound of formula (I) as a component which is abbreviated in the following as BDAF

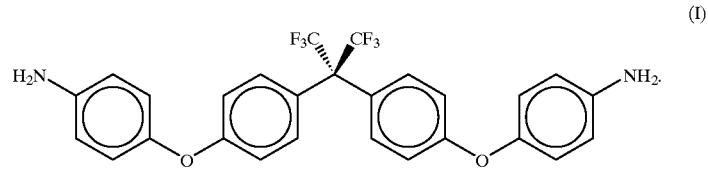

(I)

Throughout the text of this application, above and below, Roman figures in parentheses are used as an abbreviation for a formula of that number.

Japanese Kokai Patent No. 62(1987)-127827, published Jun. 10, 1987 and Japanese Kokai Patent No. 62(1987)-87939, published on Apr. 22, 1987 disclose fluorinated alignment films for liquid crystals comprising compounds of formulae (I) (BDAF) and (II), which is abbreviated in the following as 6FDA, as components

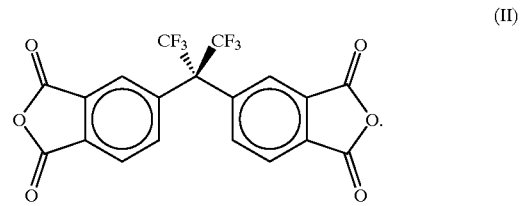

(II)

WO 9217439 describes the use of compounds of formulae (II) and (III) which is abbreviated in the following as Rf$_6$DAM

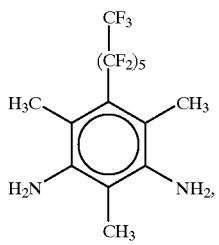
(III)

U.S. Pat. No. 5,520,845 discloses compounds of formulae (IV) and (V) which are abbreviated in the following as $Rf_8MPD$ and $Rf_{10}MPD$ respectively, as components of LC alignment layers

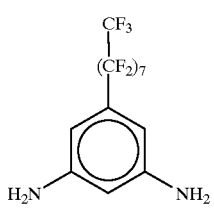
(IV)

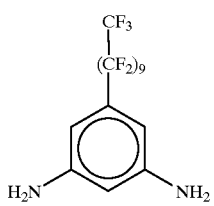
(V)

and U.S. Pat. No. 5,175,367 discloses a compound of formula (VI) which is abbreviated in the following as TFMOB, as an ingredient of polyimide films

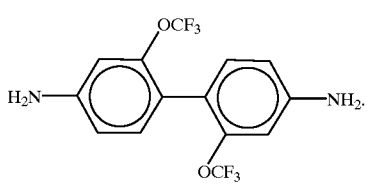
(VI)

Compounds of formulae (VII) and (VIII) which are abbreviated in the following as P3FDA and P6FDA respectively, are disclosed as components of polyimides in *Macromolecules,* Vol. 25, No. 13, 1992

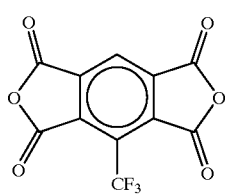
(VII)

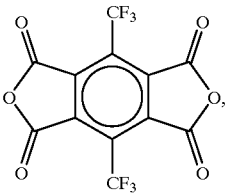
(VIII)

U.S. Pat. No. 5,344,916 discloses a compound of formula (IX) which is abbreviated in the following as TFMB as a component of polyimides used for birefringent films

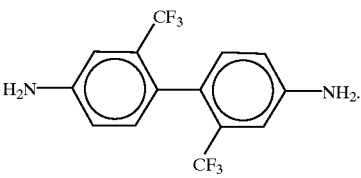
(IX)

European Patent Application EP 413194 discloses a compound of formula (X) as an ingredient of polyimides

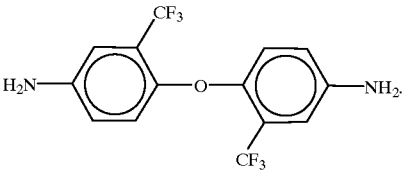
(X)

European Patent Application EP 415447 discloses a Liquid-crystal device having a polyimide film as an alignment layer comprising a compound of formula (XI)

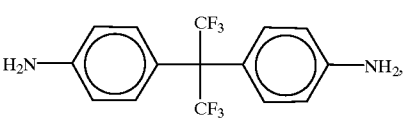
(XI)

U.S. Pat. No. 5,395,918 discloses polymides comprising compounds of the formula (XII), wherein Z may be a halogenated alkyl group of 1 to 3 carbon atoms

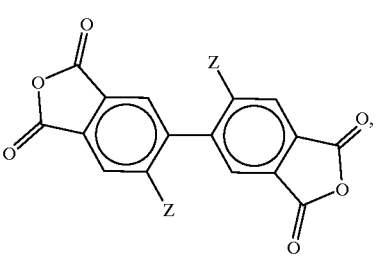
(XII)

U.S. Pat. No. 5,051,520 discloses compounds of formulae (XIII) and (XIV) as components of polyimides. (XIII) and (XIV) are abbreviated in the following as 6FCDA and 3FCDA respectively

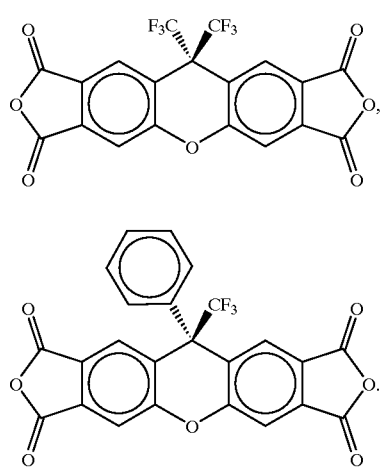
(XIII)

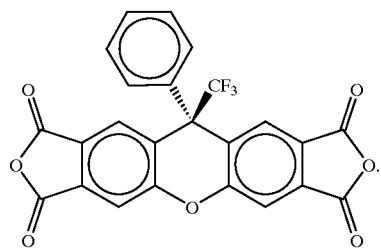
(XIV)

Finally, U.S. Pat. No. 5,186,985 discloses polyimide alignment layers having pendant fluorinated chains. These alignment layers are capable to provide tilt angles of 5 or more degrees and may comprise a compound of formula (XV) which is abbreviated in the following as $Rf_bMPD$.

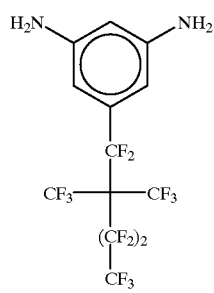
(XV)

However, none of these prior art documents, disclose a polyimide alignment film providing a high tilt angle suitable for STN LCDs that maintains the tilt angle with no or only a small reduction during the conditions of the fabrication process of a Multi-Domain LCD which includes high curing temperatures and multiple rubbing and masking procedures as described above.

SUMMARY OF THE INVENTION

The present invention provides a STN LCD device having at least two domains per pixel, comprising:

a) a liquid crystal layer having opposite sides;
b) a set of electrodes on either side of said liquid crystal layer;
c) a fluorinated polyimide alignment film for aligning a liquid crystal layer, between each set of electrodes and said liquid crystal layer, comprising an aromatic diamine component and an aromatic tetracarboxylic acid component or a functional derivative thereof, wherein at least one of these components comprise at least one fluorinated compound chosen from the formulae (XVI), (XVII), (XVIII), (XIX) or (XX):

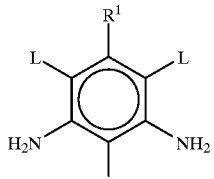
(XVI)

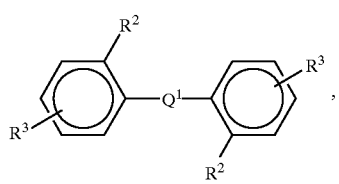
(XVII)

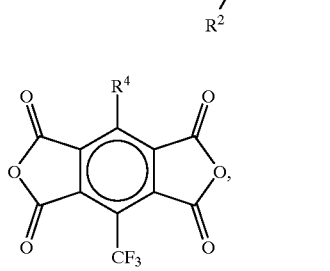
(XVIII)

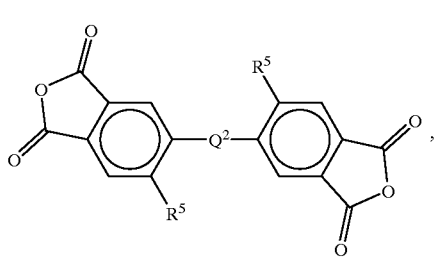
(XIX)

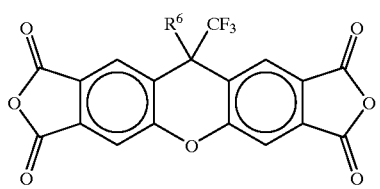
(XX)

wherein $R^1$ has the meaning of a linear or branched fluorinated alkyl group, having 1 to 16 carbon atoms, L is H or $CH_3$, $R^2$ and $R^5$ are independently of one another H, $CF_3$ or $OCF_3$, $R^4$ is H or $CF_3$, $Q^1$ has the meaning of a single bond, —O—,

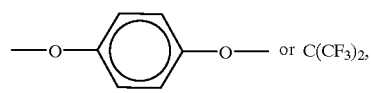 or $C(CF_3)_2$, with the proviso that $Q^1$ is $C(CF_3)_2$, when $R^2$ is H,

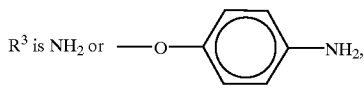

$Q^2$ has the meaning of a single bond or $C(CF_3)_2$, with the proviso that $Q^2$ is $C(CF_3)_2$, when $R^5$ is H, and

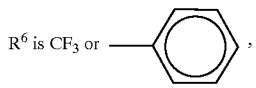

with a total amount of fluorinated components, i.e. said aromatic fluorinated diamines and fluorinated aromatic tetracarboxylic acid components or their functional derivatives, of at least 5 mole % based on the total amount of aromatic diamines and tetracarboxylic acid components comprised in the polyimide and wherein said polyimide alignment film induces the same tilt angle of 3 to 20 degrees in each of the domains of a pixel which is maintained or at least has not decreased more than 10% compared to the tilt angle of any other domain of the pixel after the conditions of the fabrication process of Multi-Domain LCD are applied to the alignment layer, which include curing of the frame sealant adhesive and multiple rubbing and masking procedures, bringing the alignment layer into contact with hydroxides like tetramethylammoniumhydroxide, dialkylethers like diethylether or esters like ethylacetate or butylacetate. The curing of the frame sealant is done by UV or by temperature curing. Preferred are thermally cured sealants preferably cured at temperatures ranging from 100° C. to 200° C.

DETAILED DESCRIPTION OF THE INVENTION

The polyimide used as an alignment film in the Multi-Domain STN liquid crystal display device of the present invention is a product of a polycondensation-imidization reaction of an aromatic tetracarboxylic acid component with an aromatic diamine component.

At least one of the components of the polyimide comprises at least one fluorinated compound chosen from the formulae (XVI), (XVII), (XVIII), (XIX) or (XX):

(XVI)

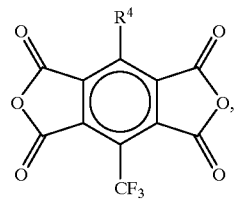

(XVII)

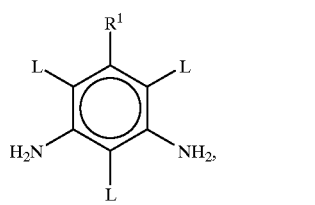

(XVIII)

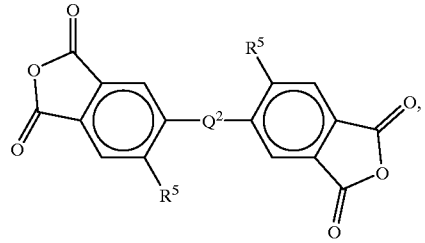

(XIX)

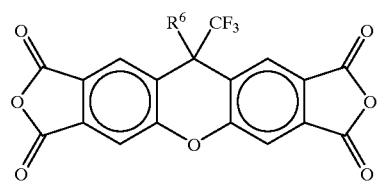

(XX)

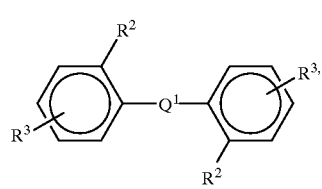

wherein $R^1$ has the meaning of a linear or branched fluorinated alkyl group, having 1 to 16 carbon atoms, L is H or $CH_3$, $R^2$ and $R^5$ are independently of one another H, $CF_3$ or $OCF_3$, $R^4$ is H or $CF_3$, $Q^1$ has the meaning of a single bond, —O—,

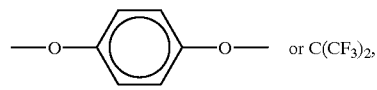 or $C(CF_3)_2$, with the proviso that $Q^1$ is $C(CF_3)_2$, when $R^2$ is H,

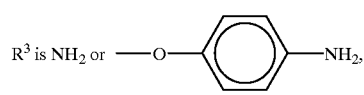

$Q^2$ has the meaning of a single bond or $C(CF_3)_2$, with the proviso that $Q^2$ is $C(CF_3)_2$, when $R^5$ is H, and

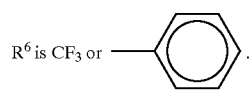

Preferred fluorinated compounds for the polyimide alignment layer employed in the inventive Multi Domain LCD are chosen from the following formulae (I), (II), (VI) to (XI), (XIII), (XIV), (XV) and (XXI) to (XXV):

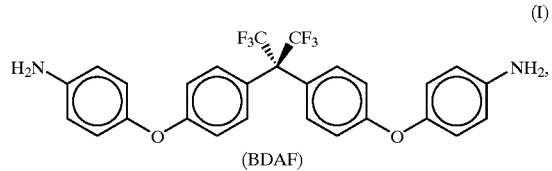
(BDAF) (I)
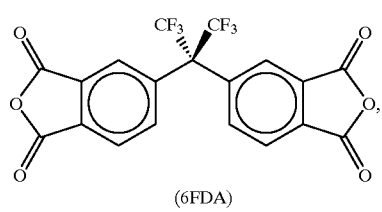
(6FDA) (II)
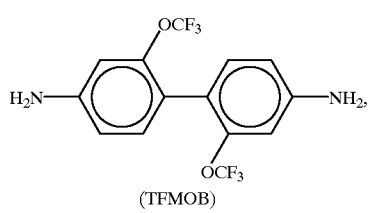
(TFMOB) (VI)
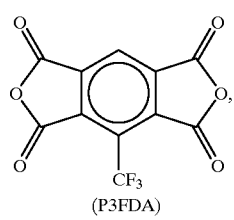
(P3FDA) (VII)
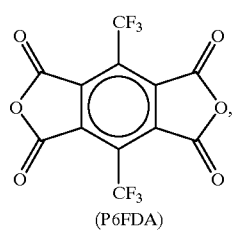
(P6FDA) (VIII)
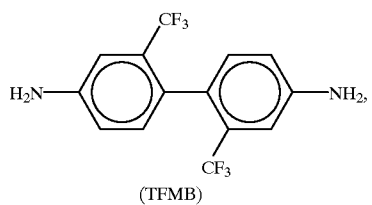
(TFMB) (IX)
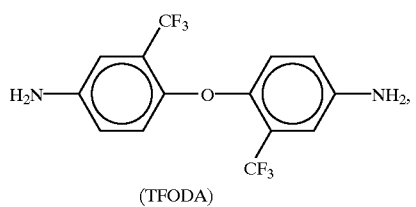
(TFODA) (X)
-continued
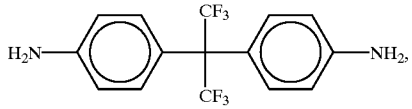
(XI)
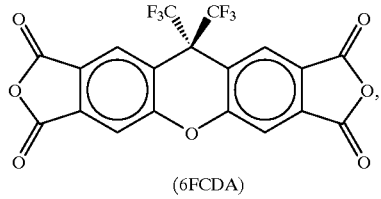
(6FCDA) (XIII)
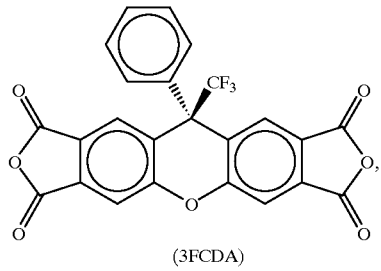
(3FCDA) (XIV)
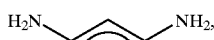
(Rf$_b$MPD) (XV)
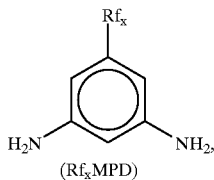
(Rf$_x$MPD) (XXI)
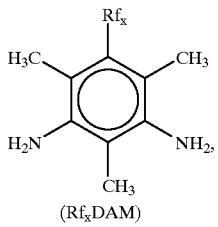
(Rf$_x$DAM) (XXII)
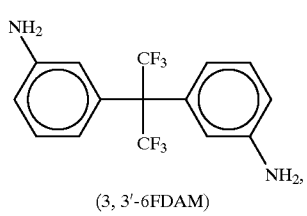
(3,3'-6FDAM) (XXIII)

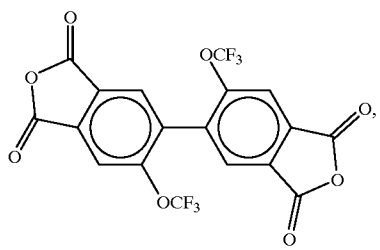
(XXIV)

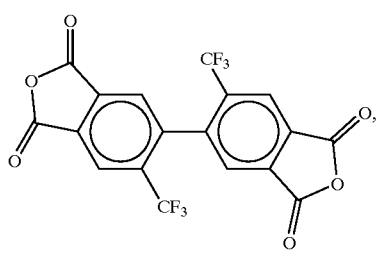
(XXV)

wherein $Rf_x$ in formulae (XXI) and (XXII) is a linear or branched perfluorinated alkyl group containing 1 to 16 carbon atoms. The index "X" indicates the number of carbon atoms of the perfluorinated alkyl group.

Especially preferred fluorinated diamines used in an alignment layer of a LCD according to the invention are BDAF (I), TFMOB (VI), $Rf_xMPD$ (XXI) or $Rf_xDAM$ (XXII) and particularly preferred diamines of the latter two compounds are $Rf_8MPD$ (IV) and $Rf_6DAM$ (III) respectively.

The aromatic diamine component may contain, in addition to the fluorinated diamine ingredient or instead of it, a diamine ingredient which includes but is not limited to 4,4'-diaminodiphenyl ether, 4,4'-diamino-3,3'-dimethylbiphenyl, 4,4'-diaminobiphenyl, 4,4'-diaminodiphenylsulfone, 3,3'-diaminodiphenylsulfone, 3,3'-diaminodiphenylsulfone, bis[4-(4-aminophenoxy)-phenyl]sulfone, bis[4-(3-aminophenoxy)phenyl]sulfone, bis[4-(2-aminophenoxy)phenyl]sulfone, 1,4-bis(4-aminophenoxy)-benzene, 4,4'-diamino-2,2'-dichloro-5,5'-dimethoxybiphenyl, 4,4'-diamino-2,2',5,5'-tetrachlorobiphenyl, 1,3-bis(4-amino-phenoxy)benzene, 1,3-(bis(3-aminophenoxy)benzene, 1,4-bis(4-aminophenyl) benzene, [4-(4-aminophenoxy)-phenyl]ether, bis(4-aminophenyl)methane, bis(4-amino-3-ethyl-phenyl) methane, bis(4-amino-3-methylphenyl)methane, bis(4-amino-3-chlorophenyl)methane, bis(3-aminophenyl)ether, 3,4'-diaminodiphenyl ether, 2,2-bis[4-(4-aminophenoxy)-phenyl]propane, 2,2-bis(4-aminophenyl)propane, 2,2-bis(4-amino-3-hydroxyphenyl)propane, 4,4'-diamino-3,3'-dichlorobiphenyl, 4,4'-diamino-3,3'-dihydroxybiphenyl, 4,4'-diaminobiphenyl, bis(3-amino-4-methylphenyl) sulfone, bis(4-amino-2,6-dimethyl-phenyl)methane, 2,4-diamino-1-isopropylbenzene, 1,4-diamino-2,5-dichlorobenzene, 1,4-diamino-2,6-dichlorobenzene, 1,4-diamino-2,5-dimethylbenzene, 1,4-diamino-2-chlorobenzene, 1,3-diamino-4-chlorobenzene, 1,4-diamino-5-chloro-2-methylbenzene, 1,4-diamino-2,3,5,6-tetramethylbenzene, 1,3-diamino-2,4,6-trimethylbenzene, p-phenylene diamine, m-phenylene diamine, 1,2-bis(4-aminophenyl)ethane, 2,4-diaminotoluene and diaminodiphenyl ether. These diamines may be used alone or in combination.

The aromatic diamines may be prepared by known procedures e.g. as described in Houben-Weyl, *Methoden der Orgianischen Chemie* [*Methods of Organic Chemistry*], Georg-Thieme-Verlag, Stuttgart or, for example, as described in U.S. Pat. No. 5,175,367 and WO 9217439.

Particularly preferred fluorinated tetracarboxylic acid ingredients used in the alignment layer of a LCD according to the invention are the anhydrides 6FDA (II), 6FCDA (XIII), (XXIV) and (XXV).

The aromatic tetracarboxylic acid component may contain, in addition to the fluorinated acid ingredient or instead of it, a tetracarboxylic acid ingredient which includes but is not limited to pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenone-tetracarboxylic acid, 2,2-bis(3,4-dicarboxy-phenyl)propane, 1,4,5,8-naphthalene-tetracarboxylic acid, 2,3,6,7-naphthalenetetracarboxylic acid, 1,2,5,6-naphthalene-tetracarboxylic acid, bis(3,4-dicarboxy-phenyl)sulfone, 1,1-bis(2,3-dicarboxyphenyl)ethane, 1,1-bis(3,4-dicarboxyphenyl)ethane, bis(2,3-dicarboxyphenyl)-methane, bis(3,4-dicarboxyphenyl)methane, bis(3,4-dicarboxy-phenyl)ether, bis(3,4-dicarboxyphenoxy) benzene, 1,3-bis(3,4-dicarboxybenzoyl)benzene and their functional derivatives, such as acid anhydrides and esters thereof. These tetracarboxylic acids and their functional derivatives,such as anhydrides,may be used alone or in combination. Of these tetracarboxylic acids and their functional derivatives, tetracarboxylic dianhydrides are preferred. Particularly preferred is the anhydride of pyromellitic acid.

The tetracarboxylic acids or their functional derivatives may be prepared by known procedures, e.g. as described in Houben-Weyl, *Methoden der Organischen Chemie* [*Methods of Organic Chemistryl*], Georg-Thieme-Verlag, Stuttgart or, for example, as described in Macromolecules, Vol. 25, No. 13, 1992.

The total amount of fluorinated components, i.e. said aromatic fluorinated diamines and fluorinated aromatic tetracarboxylic acid components or their functional derivatives, namely (XVI), (XVII), (XVIII), (XIX) or (XX), are at least 5 mole %, preferably 10 to 60%, based on the total amount of aromatic diamines and tetracarboxylic acid components comprised in the polyimide.

When the amount of fluorinated ingredients to be polymerized, is lower than 5 mole %, based on the total molar amount of the tetracarboxylic acid component or diamines respectively, the tilt angle provided by the resultant polyimide tends to be too low for use in high-tilt STN LCD and the stability of the tilt angle towards the conditions of the fabrication process of Multi-Domain LCD is also adversely affected. When the amount of fluorinated ingredients is higher than 60 mole %, based on the total molar amount of the tetracarboxylic acid component or diamines respectively, the polyimide tends to lose its ability to be orientated. Thus, in this case the tilt angle is also too low for use in high-tilt STN LCD.

Preferred liquid crystal alignment films for LCD of the present invention comprise polyimides which are prepared from precursors consisting of 50 mole % of pyromellitic dianhydride, 3,3',4,4'-biphenyltetracarboxylic acid, 2,2-bis (3,4-dicarboxyphenyl)propane or bis(3,4-dicarboxyphenyl) methane and 50 mole % of an aromatic diamine component which comprises 10 to 95 mole %, preferably 50 to 90 mole %, particularly preferred 80 to 90 mole % of 2,2'-bis (trifluoromethoxy)benzidine (VI), BDAF (I) or TFMB (IX) and 5 to 90 mole %, preferably 10 to 50 mole % and particularly preferred 10 to 20 mole % of 4,4'- diaminodiphenyl ether, 4,4'-diaminobiphenyl or bis(4-aminophenyl)methane.

Other particularly preferred liquid crystal alignment films comprise polyimides prepared from precursors consisting of 50 mole % of pyromellitic dianhydride and 50 mole % of an aromatic diamine component which comprises 60 to 95 mole %, preferably 80 to 95 mole % of 2,2'-bis (trifluoromethoxy)benzidine (VI) and 5 to 40 mole %, preferably 5 to 20 mole % of BDAF (I) or $Rf_6DAM$ (III), $Rf_8MPD$ (IV).

Furthermore, polyimides prepared from precursors consisting of 50 mole % of a tetracarboxylic acid component comprising 50 mole % of pyromellitic dianhydride and 50 mole % of 6FDA (II) or 6FCDA (XIII) and 50 mole % of an aromatic diamine component which comprises 30 to 60 mole %, preferably 35 to 55 mole %, particularly preferred 40 to 50 mole % of BDAF (I) and 40 to 70 mole %, preferably 45 to 65 mole % and particularly preferred 50 to 60 mole % of 4,4'-diaminodiphenyl ether, are preferred.

Especially preferred liquid crystal alignment films for LCD of the present invention comprise polyimides which are prepared from flurorinated diamines.

The polyimide used as an alignment film in the Multi-Domain STN liquid crystal display device of the present invention may be prepared by solution polymerization of substantially equimolar amounts of the aromatic tetracarboxylic acid component and the aromatic diamine component at ambient room temperature of about 20° C. to 50° C. in N-methylpyrrolidone or N,N-dimethylacetamide solvent.

For example, the resulting poly (amic acid) solution may be subsequently diluted and coated by spin coating onto indium-tin oxide (ITO) coated glass plates and then cured at a temperature of 100° to 350° C. for 1 minute to 2 hours, preferably from 150° to 250° C. for 30 minutes to 2 hours, to effect dehydration and ring closure of the poly(amic acid) to form a polyimide coating. The polyimide coating is further subjected to a rubbing treatment, in order to provide the alignment direction. A review of conventional alignment controlling techniques is given, for example, by I. Sage in *Thermotropic Liquid Crystals,* G. W. Gray, ed,. John Wiley & Sons, 1987, pp. 75–77 and by J. M. Geary et al. in *Journal of Applied Physics,* Vol. 62, 10, 1987, pp. 4100–4108.

In addition to this step, for the Multi-Domain STN LCD according to the invention, a masking operation is performed e.g. by photolithography which as a result covers a part of the alignment layer of the pixel with a removable layer. The photolithographic process is well known in the art and may involve the use of agents such as hydroxides like tetramethylammoniumhydroxide or dialkylethers like diethylether or esters like ethylacetate or butylacetate. This is followed by a second rubbing process. The second rubbing affects only the non-masked area and is performed in a different direction to the first rubbing. After removing the mask e.g. with a solvent such as dialkylethers like diethylether or esters like ethylacetate or butylacetate, preferably butylacetate, an orientation layer with two different areas of alignment direction results which can be used to prepare LCDs with pixels having two different domains. This process is repeated according to the number of domains of each pixel and is carried out to both the top and the bottom surface of the cell, with rubbing directions altered correspondingly to achieve the twist angle of an STN-LCD. The thickness of the alignment film typically ranges from 100 to 1000 angstroms and can be adjusted by varying the amount of polymer applied or the coating method used.

A pair of the substrates (i.e. the glass covered electrodes which are coated with the alignment controlling film) are placed in opposition to each other, so that the respective alignment films face each other, and then are bonded to each other preferably with temperature curable organic adhesives which are set at a typical peak temperature of 100° C. to 200° C., preferably of 150 to 190° C. Thus a predetermined space is formed by interposing spacers between them or by some other means. A liquid crystal composition for STN applications, for example, ZLI-2293, (sold by Merck KGaA, Germany) is filled into said space and then the filling hole is sealed with an adhesive.

After the first rubbing the polyimide alignment film used in the present invention induces a tilt angle from 3 to 20 degrees in said liquid crystal. Preferred values of the tilt angle are 4 to 18 degrees, particularly preferred are values of 6 to 16 degrees.

The tilt angle of a liquid crystal in each of the domains of a pixel is maintained or at least has not decreased more than 10%, preferably not more than 9%, compared to the tilt angle of any other domain of the pixel after multiple rubbing and masking procedures and high curing temperatures were applied to the alignment layer in the fabrication process of Multi-Domain LCD as described above.

For the sake of simplicity both masking and multiple rubbing procedures were examined independently of one another. It is obvious that each of these procedures has to induce no or only very small reductions of the tilt angle in order to achieve no or only small overall reductions of the tilt angle after both of the procedures were applied to the alignment layer in the production process of Multi-Domain LCDs.

During the masking procedure the alignment layer is brought into contact with agents for photolithography such as hydroxides like tetramethylammoniumhydroxide or dialkylethers like diethylether or esters like ethylacetate or butylacetate. Butylacetate is preferably used to remove photolithographic masks from the alignment layer.

It was found that the initial tilt angle obtained after the first rubbing of the non masked and thus unprotected area may be reduced up to 9% by applying the masking procedure, depending on the time of contact with the above mentioned hydroxides and solvents.

Furthermore it was found that the value of the tilt angle obtained by the second rubbing of the non masked area, exhibited only small reductions of usually less than 10%, compared to the values of the tilt angles of the single rubbed areas. In many cases an increase of the tilt angle up to 28% was found after the second rubbing when using fluorinated polyimides comprising (XVI), (XVII), (XVIII), (XIX), or (XX).

An increase of the tilt angle induced by the second rubbing is particularly advantageous because it compensates for the reduction of the tilt angle induced by the contact with hydroxides and solvents during the masking procedure. In cases where much larger tilt angles are obtained after the second rubbing it is easily possible to reduce the values e.g. by adjusting the time of contact with hydroxides and solvents in the masking procedure Thus it is possible to obtain a Multi-Domain LCD with pixels having no or only very small differences in tilt angles between the respective domains.

Light polarizing layers are deposited on both outside glass surfaces. The directions of polarization of the two polarizers are adjusted with respect to each other, depending on the specific cell configuration. The polarizer orientations are described, for example, in European Patent 01 31 216 and European Patent 02 60 450, while other orientations can also be used. In compensated STN cells, the two directions are either substantially perpendicular (normally black cells) or substantially parallel (normally white cells) to each other.

The liquid crystals assume a twisted orientation through the thickness of the LC layer and are following the alignment of the two alignment layers which have directions from substantially 160° to 360° to each other. For STN displays, twist angles from 170° to 270° are preferred, and twist angles from 180° to 265° are particularly preferred. Twist angles higher than 90° can be realized by adding a suitable chiral doping component to the liquid crystal mixture.

Liquid crystal components that can be used in the present invention are nematic liquid crystals. Typically the liquid crystal media are mixtures of 3 to 30 compounds. In some cases even up to 40 and more compounds can be used. Preferred are mixtures consisting of 5 to 25 compounds, especially preferred are mixtures of 7 to 20 compounds. Most preferred, however, are mixtures containing from 8 to 16 compounds.

The liquid crystals used in the Multi-Domain STN liquid crystal display device of the present invention have a clearing point of more than 60° C., preferably more than 70° C. and, most preferably, more than 80° C. For STN applications clearing points of at least 85° C. and of even more than 90° C. are preferred. The phase range is at least 80° C. wide, however, more than 90° C. is preferred. In many applications this range is more than 100° C. The lower storage temperature is at least −20° C., preferably −30° C., and most preferably −40° C.

Liquid crystals for STN displays which are especially preferred according to the present invention, preferably contain cyano phenylcyclohexanes. These mixtures preferably additionally or alternatively contain compounds with —CH═CH— groups in the alkyl side chains (i.e. alkenyl compounds) or with —CH═CH— bridging groups between the ring systems. Liquid crystals mixtures containing heterocyclic rings are further preferred.

The liquid crystal mixtures used in the LCDs according to the present invention preferably contain at least one compound of formula (XXVI)

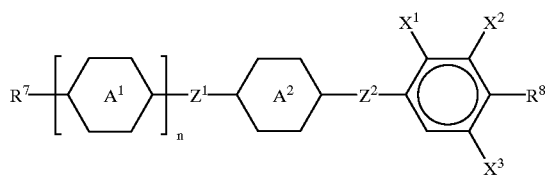

(XXVI)

wherein

R$^7$ is an alkyl group containing from 1 to 12 carbon atoms wherein, in addition, one or two non-adjacent —CH$_2$— groups can be replaced by —O—, —CO—, —COO—, —OCO— or —CH═CH—;

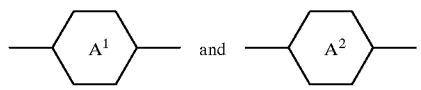

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

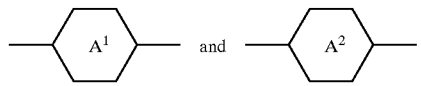

is alternatively pyrimidine-2,5-diyl, pyridine-2,5-diyl or trans-1,3-dioxane-2,5-diyl, $Z^1$ and $Z^2$ independently of one another, are a direct bond, —CH$_2$CH$_2$—, —COO—, —OCO—, —CH═CH— or —C≡C—, $X^1$, $X^2$ and $X^3$ independently of one another, are H or F, $R^8$ is the same as $R^7$ or is Q—Y, Q is —CF$_2$—, —OCF$_2$—, —C$_2$F$_4$— or a direct bond, Y is H, F, Cl or CN, and n is 0, 1 or 2.

Liquid crystal compounds according to formula (XXVI) wherein Y is H, F or Cl are defined as Super Fluorinated Materials (SFM) while compounds with Y═CN are defined as carbonitrile compounds.

The proportion of one or more compounds of the formula (XXVI) in the liquid crystal mixtures used according to the invention is preferably more than 15% by weight and, more particularly, more than 20% by weight. Liquid crystal mixtures containing more than 40% by weight and particularly more than 50% by weight of one or more compounds of the formula (XXVI) are particularly preferred.

The liquid crystal mixtures used according to the invention can contain further components which are preferably selected from nematic or nematogenic (monotropic or isotropic) substances, in particular substances selected from the group consisting of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexylphenyl cyclohexanecarboxylate, cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl) benzenes, 4,4'-bis(cyclohexyl)biphenyls, phenyl- or cyclohexlypyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electro-optical systems according to the invention may also contain one or more dielectrically neutral compounds having formulae (XXVII) and (XXVIII)

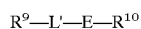 (XXVII)

 (XXVIII).

In the formulae (XXVII) and (XXVIII) above, L' and E may be identical or different and are each, independently of one another, a divalent radical selected from the group consisting of -Phe-, -Cyc-, -Phe-Phe-, -Phe-Cyc-, -Cyc- Cyc-, -Pyr-, -Dio-, -G-Phe- and -G-Cyc- and mirror images thereof. Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans(-1,4-cyclohexyl)ethyl) pyrimidine-2,5-diyl, pyridine-2,5-diyl or 1,3-dioxane-2,5-diyl. One of the radicals L' and E is preferably Cyc, Phe or Pyr. E is preferably Cyc, Phe or Phe-Cyc.

The liquid crystals used in the invention preferably contain one or more components selected from compounds of formulae (XXVII) and (XXVIII), wherein L' and E are selected from the group consisting of Cyc, Phe and Pyr and simultaneously one or more components are selected from the compounds of formulae (XXVII) and (XXVIII), wherein one of the radicals L' and E is selected from the group comprising Cyc, Phe and Pyr and the other radical is selected from the group consisting of -Phe-Phe-, -Phe-Cyc-, -Cyc-Cyc-, -G-Phe- and -G-Cyc-, and if desired one or more components are selected from the compounds of formulae (XXVII) and (XXVIII), wherein the radicals L' and E are selected from the group consisting of -Phe-Cyc-, -Cyc-Cyc-, -G-Phe- and -G-Cyc.

$R^9$ and $R^{10}$ in the compounds for formulae (XXVII) and (XXVIII) are each, independently of one another, preferably alkyl, alkenyl, alkoxy, alkenyloxy or alkanoyloxy having up to 8 carbon atoms. In most of these compounds, $R^9$ and $R^{10}$ are different from one another, one of $R^9$ and $R^{10}$ being in particular alkyl, alkoxy or alkenyl.

Especially preferred is the following group of dielectrically neutral compounds of formulae (XXIX) and (XXX).

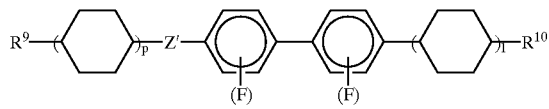

(XXIX)

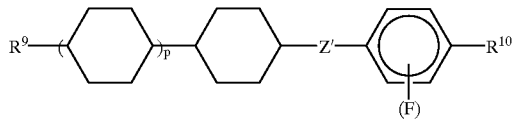

(XXX)

wherein $R^9$ and $R^{10}$ are the same as described for formulae (XXVII) and (XXVIII), $Z^1$ is a direct bond or —$CH_2CH_2$—, I and p independently from each other, are 0 or 1, and

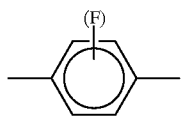

is 1,4-phenylene, 2-fluoro-1,4-phenylene, 3-fluoro-1,4-phenylene or 2,3-difluoro-1,4-phenylene.

The weight proportion of the compounds of formulae (XXVII) to (XXX) used in the liquid crystal mixtures according to the invention is preferably from 0 to 50% by weight and, in particular, from 5 to 40% by weight.

LCDs which are directly time multiplexed or active matrix addressed, preferably contain a component of one or more carbonitrile compounds. This is especially true for STN displays which can be driven by either technique. The percentage of the carbonitrile component with respect to the weight of the liquid crystal mixture for LCDs which are not addressed by an active matrix is preferably at least 10% by weight and specifically not less than 25% by weight Especially preferred are liquid crystal mixtures containing at least 20% by weight of one or more compounds of formula (XXVI) wherein Y is CN. The liquid crystal mixture of non actively addressed displays preferably contains at least 30% by weight of carbonitrile compounds and has a complex composition of at least 6 and especially at least 7 liquid crystalline compounds. In another specifically preferred embodiment, the liquid crystal mixture contains at least 15% by weight of at least one 2-ring and at least one 3-ring carbonitrile compound according to formula (XXVI) with the ratio of the percentages of 3- and 4-ring compounds to 2-ring compounds being at least 0.18.

The liquid-crystal compounds of formula (XXVI) and compounds of formula (XXVII) to (XXX) are known, and are prepared by methods known per se, for example, as described in Houben-Weyl, *Methoden der Organischen Chemie [Methods of Organic Chemistryl]*, Stuttgart, Germany.

Liquid crystal mixtures used in the present invention are well-known in the prior art. Preferred LC mixtures of the types described above, are commercially available from Merck KGaA, Germany, under the trademark Licristal®.

The present invention is illustrated in more detail by the following examples which, however, do not in any way restrict the scope of the invention. All physical parameters are obtained at a temperature of 20° C., and all concentrations are given in %-weight, unless explicitly stated otherwise.

The entire disclosure of all applications, patents and publications, cited above and below, and of corresponding European Application No. 97 110 453.4, filed Jun. 26, 1997 is hereby incorporated by reference.

| GLOSSARY | | |
|---|---|---|
| BAPP | = | 1,4-bis[4'-aminophenoxy] benzene |
| CBDA | = | cyclobutanetetracarboxylic acid dianhydride |
| 3FCDA | = | 9-phenyl-9-trifluoromethyl-2,3,6,7-xanthene tetracarboxylic dianhydride |
| 6FCDA | = | 9,9-bis(trifluoromethyl)-2,3,6,7-xanthene tetracarboxylic dianhydride |
| 6FDA | = | 2,2-bis(3,4-dicarboxyphenyl)hexafluoropropane dianydride |
| 6FDAM | = | 2,2-bis(4-aminophenyl)hexafluoropropane |
| 3,3'-6FDAM | = | 2,2-bis(3-aminophenyl)hexafluoropropane |
| BDAF | = | 2,2-bis(4-(aminophenoxy)phenyl)-hexafluoropropane |
| DMSO | = | dimethylsulfoxide |
| ITO | = | indium/tin oxide |
| KHz | = | Kilohertz |
| nm | = | nanometer |
| NMP | = | N-methylpyrrolidone |
| ODA | = | 4,4'-diaminodiphenyl ether |
| P3FDA | = | 1-(trifluoromethyl)-2,3,5,6-benzene-tetracarboxylic dianhydride |
| P6FDA | = | 1,4-bis(trifluoromethyl)-2,3,5,6-benzene-tetracarboxylic dianhydride |
| PAA | = | poly(amic acid) |
| PI | = | polyimide |
| PMDA | = | pyromellitic dianhydride |
| $Rf_6DAM$ | = | 2,4,6-trimethyl-5-tridecafluorohexylbenzene-1,3-diamine |
| $Rf_8MPD$ | = | 5-perfluorooctyl-1,3-phenylenediamine |
| $Rf_{10}MPD$ | = | 5-perfluorodecyl-1,3-phenylenediamine |
| Rh12Ma | = | n-dodecylamine |
| TFMB | = | 2,2-bis(trifluoromethyl)benzidine |

-continued

| GLOSSARY | | |
|---|---|---|
| TFMBPDA | = | 2,2'-bis(trifluoromethyl)4,4',5,5'-biphenyl tetracarboxylic dianhydride |
| TFM-144 | = | 1,4-bis[4'-amino-2'-(trifluoromethyl)phenoxy]benzene |
| TFMOB | = | 2,2'-bis(trifluoromethoxy)benzidine |
| TFMOBPDA | = | 2,2'-bis(trifluoromethoxy)-4,4',5,5'-biphenyl tetracarboxylic dianhydride |
| TFODA | = | 2,2'-bis(trifluoromethyl)4,4'-diamino diphenyl ether |
| ZLI-2293 | = | a liquid crystal mixture of cyanophenyl-cyclohexanes and biphenylcyclohexanes having a clearing point of 85° C., a dielectric anisotropy of 10 (1 KHz, 20° C.) and an optical anisotropy of 0.1322 (20° C., 589 nm) (sold by Merck KGaA, Darmstadt) |

EXAMPLE 1

Into a 100 ml reaction kettle equipped with a mechanical stirrer and nitrogen inlet and outlet were charged 3.843 g (12.01 mmole) of TFMOB (VI) and 0.268 g (1.34 mmole) of ODA along with 38 ml of NMP. After dissolution of the diamines, 2.911 g (13.35 mmole) of PMDA powder was added and rinsed in with 4 ml NMP (42 ml NMP total). The kettle was cooled with a water bath to moderate the temperature of the reaction. The reaction was stirred overnight at room temperature under nitrogen and then diluted with 20 ml of NMP. A viscous, light yellow poly(amic acid) solution resulted, a portion of which was diluted to 3.5% solids with NMP (viscosity 56 cps, thickness of the cured film of 910 angstroms at 3000 RPM spin speed). The diluted PAA solution was spin coated onto ITO coated glass plates. The PAA coated glass plates were then placed on a hot plate at 100° C. for 1 minute, followed by curing in an oven under air at 180–250° C. for 1.5 hours. Three coated plates were then rubbed under three different conditions:

a) The first, as a reference, was buffed once in one direction with a rayon cloth (YOSHIKAWA YA20R) on a rubbing machine (KETEK, Inc.) using the following conditions: radius of rubbing wheel=50 mm, rotation speed =190 rpm, translation speed of glass plate=25 mm/second, pile impression=0.3 mm.

b) The second plate was rubbed a second time under the same conditions, in a perpendicular direction to the first rubbing direction.

c) The third plate was also rubbed a second time under the same conditions, but the second rubbing was performed in the opposite direction.

For tilt angle measurements, the coated glass plates were cut into two parts and assembled to a cell, so that their respective rubbing directions were anti-parallel to each other. The spacing between the glass plates was set at 50 micrometers by incorporation of glass fibers into a UV curable adhesive placed around the perimeter of the plates, followed by curing of the adhesive by UV radiation. Two small gaps in the adhesive were left to allow filling of the cell. The liquid crystal mixture was filled into the gap between the plates via capillary action via the two gaps in the adhesive. The completed cell was placed in an oven at 120° C. for 20 minutes to allow for complete isotropization of the LC mixture.

The test cells were then cooled and stored at room temperature for 12 hours prior to measurement of the tilt angle. Tilt angle measurements in this and the following examples were performed using the crystal rotation method as described by G. Baur et al., *Physics Letters,* Vol. 56A, No. 2, pp. 142–144, 1976.

The liquid crystal test cell containing the polyimide alignment layer and ZLI-2293 (Merck KGaA, Germany) as liquid crystal mixture exhibited an initial tilt angle of 8.0° when the polyimide alignment layer was rubbed once as described under a). The value of the initial tilt angle decreased to 7.8°(−3% deviation) for the alignment layer which was rubbed a second time in a perpendicular direction as described under b). A slightly higher value, 8.4°(5% increase), was found, when the alignment layer was rubbed a second time in the opposite direction as described under c).

EXAMPLE 2

Example 1 was repeated using a polyimide as an alignment layer which consisted of PMDA as dicarboxylic acid ingredient and an equimolar mixture of TFMOB and ODA as diamine ingredient. The liquid crystal test cell containing the polyimide alignment layer and ZLI-2293 as liquid crystal mixture exhibited an initial tilt angle of 5.1° when the polyimide alignment layer was rubbed once as described in example 1 under a). The value of the initial tilt angle decreased to 4.80°(−6% deviation) for the alignment layer which was rubbed a second time in a perpendicular direction as described in example 1 under b). A value of 4.8°(−6% deviation), was found, when the alignment layer was rubbed a second time in the opposite direction as described in example 1 under c).

EXAMPLE 3

Example 1 was repeated using a polyimide as an alignment layer which consisted of PMDA as dicarboxylic acid ingredient and BDAF as diamine ingredient. The test cell exhibited the following tilt angles:

| tilt angle | rubbing cond. |
|---|---|
| 5.1° | rubbing according to ex. 1a) |
| 4.90° (−4% deviation) | second rubbing according to ex. 1b) |

EXAMPLE 4

Example 1 was repeated using a polyimide as an alignment layer which consisted of PMDA as dicarboxylic acid ingredient and a mixture of 95 mole % TFMOB and 5 mole % $Rf_8BMPD$ as diamine ingredient. The test cell exhibited the following tilt angles:

| tilt angle | rubbing cond. |
|---|---|
| 9.4° | rubbing according to ex. 1a) |
| 9.9° (+5% deviation) | second rubbing according to ex. 1b) |
| 10.7° (+14% deviation) | second rubbing according to ex. 1c) |

EXAMPLE 5

Example 1 was repeated using a polyimide as an alignment layer which consisted of PMDA as dicarboxylic acid ingredient and TFM-144 as diamine ingredient. The test cell exhibited the following tilt angles:

| tilt angle | rubbing cond. |
|---|---|
| 3.1° | rubbing according to ex. 1a) |
| 3.7° (+20% deviation) | second rubbing according to ex. 1b) |

EXAMPLE 6

Example 1 was repeated using a polyimide as an alignment layer which consisted of PMDA as dicarboxylic acid ingredient and 3,3'-6FDAM as diamine ingredient. The test cell exhibited the following tilt angles:

| tilt angle | rubbing cond. |
|---|---|
| 7.3° | rubbing according to ex. 1a) |
| 7.1° (−3% deviation) | second rubbing according to ex. 1b) |

EXAMPLE 7

Example 1 was repeated using a polyimide as an alignment layer which consisted of PMDA as dicarboxylic acid ingredient and a mixture of 90 mole % TFMOB and 10 mole % 6FDAM as diamine ingredient. The test cell exhibited the following tilt angles:

| tilt angle | rubbing cond. |
|---|---|
| 8.3° | rubbing according to ex. 1a) |
| 9.0° (+8% deviation) | second rubbing according to ex. 1b) |
| 10.6° (+28% deviation) | second rubbing according to ex. 1c) |

Comparative Example C1

Example 1 was repeated using a polyimide consisting of CBDA/BAPP/Rh12 Ma in a mole ratio of 100/83/18. The liquid crystal test cell containing this polyimide alignment layer and ZLI-2293 as liquid crystal mixture exhibited an initial tilt angle of 5.5° when the polyimide alignment layer was rubbed once as described in example 1 under a). The value of the initial tilt angle decreased to 4.5°(−18% deviation) for the alignment layer which was rubbed a second time in a perpendicular direction as described in example 1 under b). A value of 4.3°(−22% deviation), was found, when the alignment layer was rubbed a second time in the opposite direction as described in example 1 under c).

Comparative Example C2

Example 1 was repeated using SE-3140 (Nissan Chemicals, Japan) as a polyimide alignment layer. The liquid crystal test cell containing the polyimide alignment layer SE-3140 and ZLI-2293 as liquid crystal mixture exhibited an initial tilt angle of 6.4° when the polyimide alignment layer was rubbed once as described in example 1 under a). The value of the initial tilt angle decreased to 5.8°(−9% deviation) for the alignment layer which was rubbed a second time in a perpendicular direction as described in example 1 under b). A value of 5.7°(−11% deviation), was found, when the alignment layer was rubbed a second time in the opposite direction as described in example 1 under c).

Comparative Example C3

Example 1 was repeated using the polyimide SE610 (Nissan Chemicals, Japan) as an alignment layer. The test cell exhibited the following tilt angles:

| tilt angle | rubbing cond. |
|---|---|
| 13.4° | rubbing according to ex. 1a) |
| 11.8° (−12% deviation) | second rubbing according to ex. 1b) |
| 10.7° (−20% deviation) | second rubbing according to ex. 1c) |

EXAMPLE 8

The effect of elevated temperature, for curing temperature-curable adhesives, on the tilt angle provided by the polyimide was detected as follows:

A set of three glass plates which where coated and rubbed as described in example 1 and was heated for 2 h at 180° C. After assembling the cells following example 1, a tilt angle measurement was performed. After heating the coated plates, the values of the tilt angle settled at 7.4° for the plate which was rubbed once as described in example 1 under a), 7.2°(−3% tilt angle deviation) for the plate which was rubbed a second time perpendicular to the first rubbing as described in example 1 under b) and 7.2°(−3% tilt angle deviation) for the plate which was rubbed a second time in the opposite direction as described in example 1 urader c).

EXAMPLE 9

Example 8 was repeated using the polyimide of example 2 as an alignment layer. The following tilt angles were obtained after heating the coated plates:

| tilt angle | rubbing cond. |
|---|---|
| 4.9° | rubbing according to ex. 1a) |
| 4.4° (−10% deviation) | second rubbing according to ex. 1b) |
| 4.5° (−8% deviation) | second rubbing according to ex. 1c) |

EXAMPLE 10

Example 8 was repeated using the polyimide of example 3 as an alignment layer.

The following tilt angles were obtained after heating the coated plates:

| tilt angle | rubbing cond. |
|---|---|
| 4.4° | rubbing according to ex. 1a) |
| 4.4° (0% deviation) | second rubbing according to ex. 1b) |
| 4.0° (−9% deviation) | second rubbing according to ex. 1c) |

EXAMPLE 11

Example 8 was repeated using the polyimide of example 7 as an alignment layer. The following tilt angles were obtained after heating the coated plates:

| tilt angle | rubbing cond. |
|---|---|
| 7.1° | rubbing according to ex. 1a) |
| 7.2° (+1% deviation) | second rubbing according to ex. 1b) |
| 8.8° (+24% deviation) | second rubbing according to ex. 1c) |

Comparative Example C4

Example 8 was repeated using the polyimide of example C1 as a polyimide alignment layer. After heating the coated plates, the values of the tilt angle settled at 4.4° for the plate which was rubbed once as described in example 1 under a), 3.4°(−23% tilt angle deviation) for the plate which was rubbed a second time perpendicular to the first rubbing as described in example 1 under b) and 3.2°(−27% tilt angle deviation) for the plate which was rubbed a second time in the opposite direction as described in example 1 under c).

Comparative Example C5

Example 8 was repeated using SE-3140 as a polyimide alignment layer. After heating the coated plates, the values of the tilt angle settled at 5.4° for the plate which was rubbed once as described in example 1 under a), 4.9°(−9% tilt angle deviation) for the plate which was rubbed a second time perpendicular to the first rubbing as described in example 1 under b) and 4.7°(−13% tilt angle deviation) for the plate which was rubbed a second time in the opposite direction as described in example 1 under c).

Comparative Example C6

Example 8 was repeated using SE610 as a polyimide alignment layer. The following tilt angles were obtained after heating the coated plates:

| tilt angle | rubbing cond. |
| --- | --- |
| 8.7° | rubbing according to ex. 1a) |
| 7.4° (−15% deviation) | second rubbing according to ex. 1b) |
| 7.0° (−20% deviation) | second rubbing according to ex. 1c) |

EXAMPLE 12

The influence of butylacetate on the tilt angle provided by the polyimide was detected as follows:

One of two sets of three glass plates which where coated and rubbed as described in example 1 under a), b) and c), was dipped into butylacetate for 30 seconds and the other was dipped into the same solvent for 1 minute. The cells were assembled and the measurements of the tilt angles were performed as described in example 1. The following table shows the values and the deviation to the values of the measurement in example 1:

|  |  | tilt angle | reference tilt angle | deviation |
| --- | --- | --- | --- | --- |
| a) rubbing once |  |  |  |  |
| dipping time | 30 sec. | 7.9° | 8.0° | −1% |
|  | 60 sec. | 8.2° | 8.0° | 3% |
| b) rubbing perpend. |  |  |  |  |
| dipping time | 30 sec. | 7.7° | 7.8° | −1% |
|  | 60 sec. | 8.0° | 7.8° | 3% |
| c) rubbing opposite |  |  |  |  |
| dipping time | 30 sec. | 8.3° | 8.4° | −1% |
|  | 60 sec. | 8.5° | 8.4° | 1% |

EXAMPLE 13

The influence of tetramethylammoniumhydroxide on the tilt angle provided by the polyimide was detected as follows:

Two glass plates coated as described in example, were rubbed twice. The second rubbing was performed perpendicular to the first rubbing direction as described in example 1 under b). One plate was in between dipped into tetramethylammoniumhydroxide for 5 seconds and the other plate was dipped into tetramethylammoniumhydroxide for 10 seconds.

The cells were assembled and the measurements of the tilt angles were performed as described in example 1. The following table shows the values and the deviation to the values of the measurements in example 1.

|  |  | tilt angle | reference tilt angle | deviation |
| --- | --- | --- | --- | --- |
| rubbing perpendic. |  |  |  |  |
| dipping time | 5 sec. | 7.1° | 7.8° | −9% |
|  | 10 sec. | 7.3° | 7.8° | −6% |

EXAMPLE 14

The dependence of the contrast ratio of a LCD pixel on the tilt angle was assessed as follows:

The values of maximum contrast of two multiplexed STN-cells (Number of rows N=240), which were identical except for their tilt angles of 8.8° and 8.0° i.e. 9% tilt angle reduction, were measured. Different tilt angles of the cells were obtained by using different rubbing conditions. The maximum contrast for both of the cells occurred at 26 V driving voltage. The ratio of pixel transparencies in the non-selected and in the selected state, which can be regarded as the contrast ratio, was found to be 1:4 for both of the cells with 8.8° and 8.0° tilt angle under identical viewing angles. Thus, the contrast is maintained when the tilt angle exhibit deviations of about 10%.

In order to determine the contrast change when the tilt angle deviation is larger than 10%, cells with tilt angles of 11.5° and 8.8°, i.e. 24% tilt angle reduction, were measured as described above. The maximum contrast for both of the cells occurred at 25 V driving voltage. In this case, the contrast for pixels of the cell with 8.0° tilt angle was found to be 1:2.6 and 1:4.8 for pixels of the cell with 11.5° tilt angle under identical viewing angles. Thus, a larger tilt angle reduction leads already to significant reduction of contrast.

EXAMPLE 15

Two identical glass plates of 2 cm² size with ten parallel lines of ITO layer of 1 mm breadth and 2 cm length, centered symmetrically on the glass plates, with a distance between each of these lines of 0.2 mm, were covered with a polyimide layer according to example 1.

Both of these glass plates were rubbed with a cloth as described in example 1a) in order to obtain an oriented alignment layer. One plate was rubbed parallel and the other was rubbed perpendicular to the ITO lines.

Then a photolithographic masking procedure was applied which is well known in the art. In this process the glass plates were covered with a layer of a photosensitive polymer (Photoresist HPR-504 sold by OCG) and each of the plates were exposed to UV radiation in a pattern of ten parallel stripes of 0.5 mm breadth and 1.5 cm length, with a distance between each of these lines of 0.7 mm. To the plate which was rubbed parallel to the ITO stripes, this pattern was applied parallel to these stripes in such a way that each half of each ITO stripe was covered with a layer of photosensitive polymer exposed to UV radiation. To the other glass plate the pattern of parallel stripes of UV radiation was applied perpendicular to the ITO stripes in a centered symmetrical manner. Thus, each of the ITO stripes on this plate was covered by alternating areas of the photosensitive polymer which were protected against UV radiation or exposed to UV radiation respectively.

Both of the plates were dipped in tetramethylammoniumhydroxide for 10 seconds and were washed thoroughly with water in order to remove the part of the photosensitive layer which had been exposed to UV radiation. The dry plates were then rubbed a second time opposite to the first rubbing direction as described in example 1c). In order to remove the rest of the photosensitive polymer, the plates were dipped in butylacetate for 1 minute.

The coated glass plates were assembled to a cell in such a way that the ITO stripes on the one glass plate were arranged perpendicular to the ITO stripes on the other glass plate. Thus, 100 overlapping areas resulted having an ITO layer on the top and on the bottom glass plate, constituting the pixels of the display cell. The alignment layers of each of these pixels were thus divided into two areas of opposite alignment direction by the above rubbing and masking procedure, forming two domains in each pixel. The spacing between the glass plates was set at 7.2 micrometers by incorporation of suitable spacers into a temperature curable adhesive placed around the perimeter of the plates, followed by curing of the adhesive for 2 h at 180° C. Two small gaps in the adhesive were left to allow filling of the cell. The liquid crystal mixture ZLI-2293 and an appropriate chiral dopant was filled into the gap between the plates via capillary action. The completed cell was placed in an oven at 120° C. for 20 minutes to allow for complete isotropization of the LC mixture. The cell was then cooled and stored at room temperature for 12 hours before the optical properties were assessed. An excellent contrast with extraordinarily small dependence on the viewing angle was observed. Since tilt angle measurements require larger pixel sizes, the value of the tilt angle under these conditions could be obtained by assembling a cell according to example 1 but with only one pixel of the size 1 cm². The additon of a chiral dopant to the liquid crystal was omitted for the measurement. The values of the tilt angles for each domain of the pixel was 7.4° and 6.7° respectively. The reduction of the tilt angle was 10%.

Comparative Example C7

Example 15 was repeated using the polyimide of example C1 as an alignment layer. The cell was found to exhibit a poor contrast with a strong dependence on the viewing angle. The values of the tilt angles for each domain of the pixel was 3.2° and 4.1° respectively. The reduction of the tilt angle is 22%.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A STN LCD device having at least two domains per pixel comprising:

a) a liquid crystal layer having opposite sides;

b) a set of electrodes on either side of said liquid crystal layer;

c) a fluorinated polyimide alignment film for aligning a liquid crystal layer, between each set of electrodes and said liquid crystal layer, comprising an aromatic diamine component and an aromatic tetracarboxylic acid component or a functional derivative thereof, which includes acid anhydrides and esters wherein at least one of these components comprise at least one fluorinated compound chosen from the formulae (XVI), (XVII), (XVIII), (XIX) or (XX):

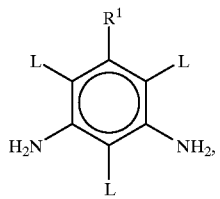

(XVI)

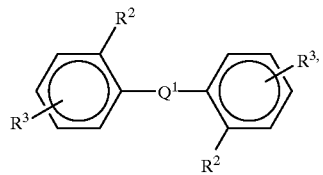

(XVII)

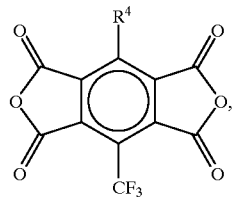

(XVIII)

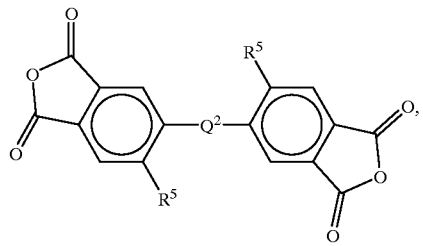

(XIX)

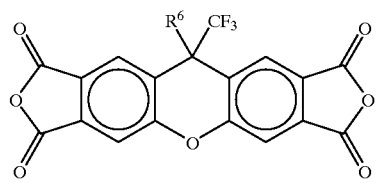

(XX)

wherein $R^1$ has the meaning of a linear or branched fluorinated alkyl group, having 1 to 16 carbon atoms, L is H or $CH_3$, $R^2$ and $R^5$ are independently of one another H, $CF_3$ or $OCF_3$, $R^4$ is H or $CF_3$, $Q^1$ has the meaning of a single bond, —O—,

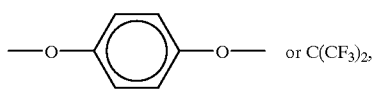 or $C(CF_3)_2$, with the proviso that $Q^1$ is $C(CF_3)_2$, when $R^2$ is H, $R^3$ is $NH_2$ or 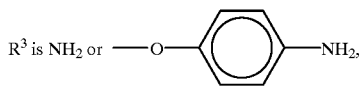

$Q^2$ has the meaning of a single bond or $C(CF_3)_2$, with the proviso that $Q^2$ is $C(CF_3)_2$, when $R^5$ is H, and $R^6$ is $CF_3$ or 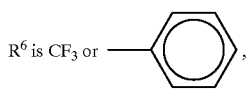, with a total amount of aromatic fluorinated diamines and fluorinated aromatic tetracarboxylic acid anhydrides or their functional derivatives of at least 5 mole % based on the total amount of aromatic diamines and tetracarboxylic acid components comprised in the polyimide; and wherein said polyimide alignment film induces the same tilt angle of 3 to 20 degrees in each of the domains of a pixel which is maintained or at least has not decreased more than 10% compared to the tilt angle of any other domain of the pixel in said LCD.

2. The STN LCD device having at least two domains per pixel comprising a fluorinated alignment film of claim 1 wherein the alignment film is prepared by a process comprising curing of 9 frame sealant adhesive and multiple rubbing and masking procedures and bringing the alignment film into contact with a hydroxide, dialkylether or ester.

3. The STN LCD device of claim 2, wherein the hydroxide is tetramethylmonium hydroxide, the dialkylether is diethylether and the ester is ethylacetate or butylacetate.

4. The STN LCD device having at least two domains per pixel comprising a fluorinated alignment film of claim 1 wherein the alignment film is prepared by a process which comprises more than one series of fabrication steps including rubbing, masking, contacting by solvents and developing agents, and heating to cure 9 frame sealant.

5. The STN LCD device having at least two domains per pixel comprising a fluorinated polyimide alignment film of claim 1 comprising an aromatic diamine component and an aromatic tetracarboxylic acid component or a functional derivative thereof, wherein at least one of these components comprise at least one fluorinated compound chosen from the formulae (I), (II), (VI) to (XI), (XIII), (XIV), (XV) and (XXI) to (XXV)

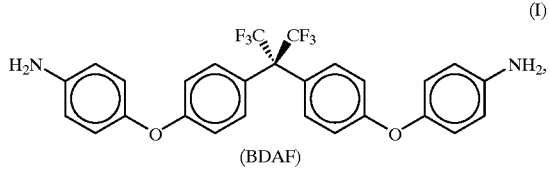

(I)
(BDAF)

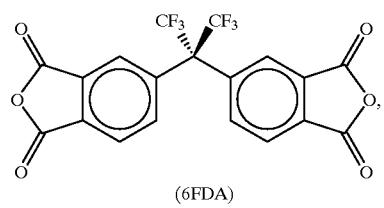

(II)
(6FDA)

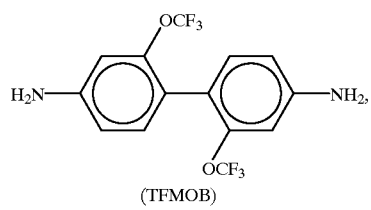

(VI)
(TFMOB)

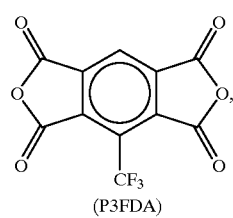

(VII)
(P3FDA)

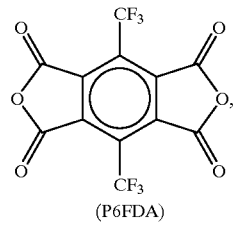

(VIII)
(P6FDA)

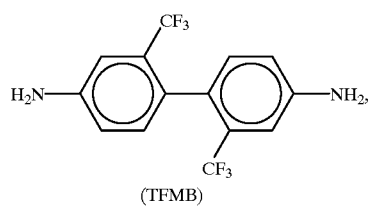

(IX)
(TFMB)

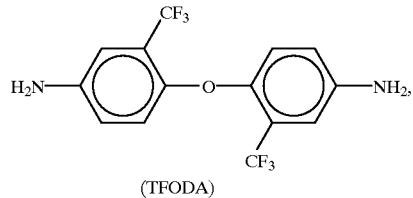

(X)
(TFODA)

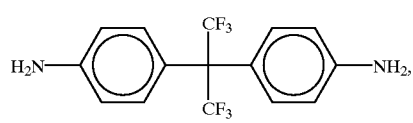

(XI)

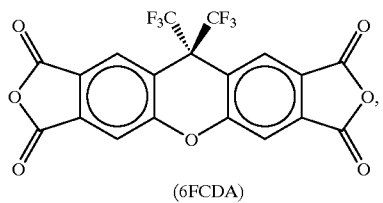

(6FCDA)

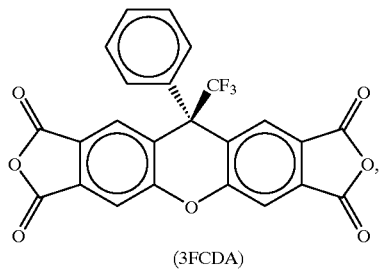

(3FCDA)

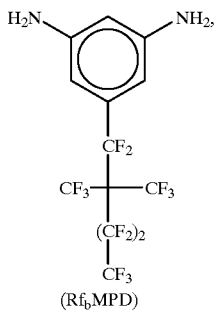

(Rf<sub>b</sub>MPD)

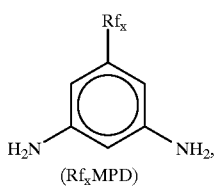

(Rf<sub>x</sub>MPD)

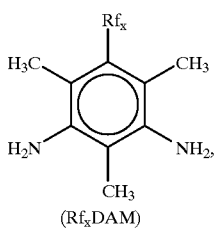

(Rf<sub>x</sub>DAM)

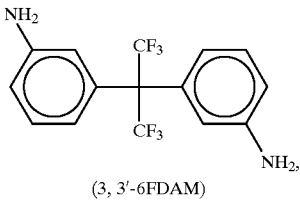

(3, 3'-6FDAM)

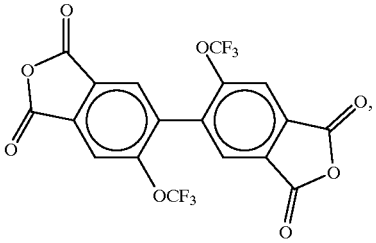

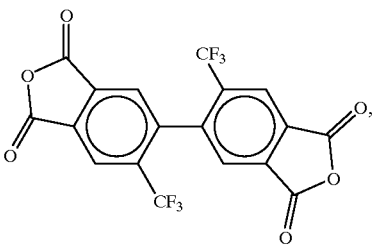

6. The STN LCD device having at least two domains per pixel comprising a fluorinated polyimide alignment film of claim 1 wherein the total amount of aromatic fluorinated diamines and fluorinated aromatic tetracarboxylic acid anhydrides or their functional derivatives is 10 to 60 mole % based on the total amount of aromatic diamines and tetra-carboxylic acid components comprised in the polyimide.

7. The STN LCD device having at least two domains per pixel comprising a fluorinated polyimide alignment film according to claim 5 wherein the fluorinated tetracarboxylic acid component comprises the anyhdride 6FDA of formula (II), 6FCDA of formula (XIII), of formula (XXIV) or of formula (XXV).

8. The STN LCD device having at least two domains per pixel comprising a fluorinated polyimide alignment film of claim 5 wherein the fluorinated diamine component comprises TFMOB of formula (VI), BDAF of formula (I), Rf<sub>8</sub>MPD of formula (IV) or Rf6DAM of formula (III).

9. The STN LCD device having at least two domains per pixel comprising a fluorinated polyimide alignment film according to claim 1 further comprising an additional diamine ingredient selected from the group consisting of 4,4'-diaminodiphenyl ether, 4,4'-diamino-3,3'- dimethylbiphenyl, 4,4'-diaminobiphenyl, 4,4'-diaminodiphenylsulfone, 3,3'-diaminodiphenylsulfone, 3,3'-diaminodiphenylsulfone, bis[4-(4-aminophenoxy)phenyl]sulfone, bis[4-(3-aminophenoxy)phenyl]sulfone, bis[4-(2-aminophenoxy)-phenyl]sulfone, 1,4-bis(4-aminophenoxy)benzene, 4,4'-diamino-2,2'-dichloro-5,5'-dimethoxybiphenyl, 4,4'-diamino-2,2',5,5'-tetrachlorobiphenyl, 1,3-bis(4-aminophenoxy)benzene, 1,3-(bis(3-aminophenoxy)benzene, 1,4-bis(4-aminophenyl)-benzene, [4-(4-aminophenoxy)phenyl]ether, bis(4-aminophenyl)-methane, bis(4-amino-3-ethylphenyl) methane, bis(4-amino-3-methylphenyl)methane, bis(4-amino-3-chlorophenyl)methane, bis(3-aminophenyl)ether, 3,4'-diaminodiphenyl ether, 2,2-bis[4-(4-aminophenoxy)phenyl]propane, 2,2-bis(4-aminophenyl)propane, 2,2-bis(4-amino-3-hydroxyphenyl)propane, 4,4'-diamino-3,3'-dichlorobiphenyl, 4,4'-diamino-3,3'-dihydroxybiphenyl, 4,4'-diaminobiphenyl, bis(3-amino-4-methylphenyl)sulfone, bis(4-amino-2,6-dimethylphenyl)methane, 2,4-diamino-1-isopropylbenzene, 1,4-diamino-2,5-dichlorobenzene, 1,4-diamino-2,6-dichlorobenzene, 1,4-diamino-2,5-dimethylbenzene, 1,4-diamino-2-chlorobenzene, 1,3-diamino-4-chlorobenzene, 1,4-diamino-5-chloro-2-methylbenzene, 1,4-diamino-2,3,5,6-tetramethylbenzene, 1,3-diamino-2,4,6-trimethylbenzene, p-phenylene diamine, m-phenylene diamine, 1,2-bis(4-aminophenyl)ethane, 2,4-diaminotoluene and diaminodiphenyl ether.

10. The STN LCD device having at least two domains per pixel comprising a fluorinated polyimide alignment film according to claim 1 further comprising an additional tetracarboxylic acid ingredient selected from the group consisting of pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2-bis(3,4-dicarboxy-phenyl)propane, 1,4,5,8-naphthalene-tetracarboxylic acid, 2,3,6,7-naphthalenetetracarboxylic acid, 1,2,5,6-naphthalenetetracarboxylic acid, bis(3,4-dicarboxyphenyl)sulfone, 1,1-bis-(2,3-dicarboxyphenyl)ethane, 1,1-bis(3,4-carboxyphenyl)ethane, bis(2,3-dicarboxyphenyl)methane, bis(3,4-dicarboxyphenyl)methane, bis(3,4-dicarboxyphenyl)ether, bis(3,4-dicarboxyphenoxy)benzene, 1,3-bis(3,4-dicarboxybenzoyl)benzene and functional derivatives thereof including acid anhydrides and esters.

11. The STN LCD device having at least two domains per pixel comprising a fluorinated polyimide alignment film of claim 1 wherein the aromatic tetracarboxylic acid component comprises pyromellitic acid-anhydride.

12. The STN LCD device having at least two domains per pixel comprising a fluorinated polyimide alignment film of claim 1 wherein the alignment film is prepared from precursors consisting of 50 mole % of pyromelletic dianhydride, 3,3',4,4'-biphenyltetracarboxylic acid, 2,2-bis(3,4-dicarboxyphenyl) propane or bis(3,4-dicarboxyphenyl)-methane and 50 mole % of an aromatic diamine component which comprises 10 to 95 mole % of 2,2'-bis(trifluoromethoxy)benzidine [(VI)], [BDAF (I)] the compound given by the structure

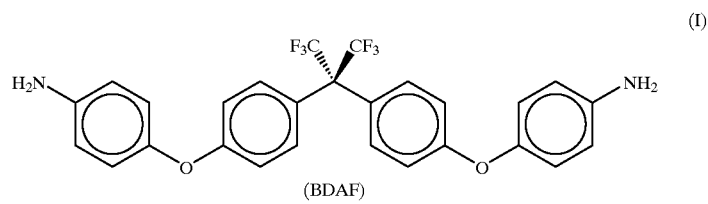

(BDAF)

or [TFMB (IX)] the compound given by the structure

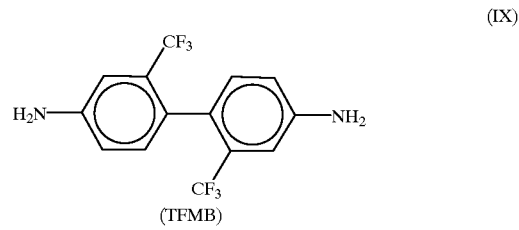

(TFMB)

and 5 to 90 mole % of 4,4'-diaminodiphenyl ether, 4,4'-diaminobiphenyl or bis(4-aminophenyl)-methane.

13. The STN LCD device having at least two domains per pixel comprising a fluorinated polyimide alignment film of claim 1 wherein the alignment film is prepared from precursors consisting of 50 mole % of pyromelletic dianhydride and 50 mole % of an aromatic diamine component which comprises 60 to 95 mole % of 2,2'-bis(trifluoromethoxy)-benzidine and 5 to 40 mole % of the compound given by the structure

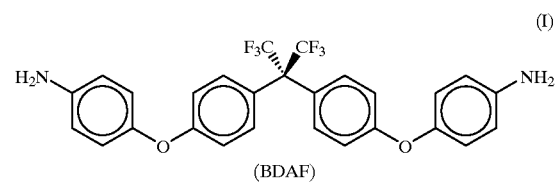

(BDAF)

the compound given by the structure

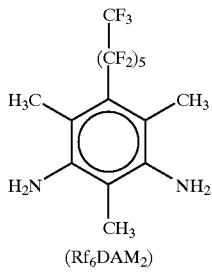
(Rf$_6$DAM$_2$)

or the compound given by the structure

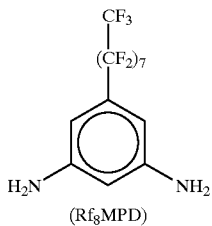
(Rf$_8$MPD)

14. The STN LCD device having at least two domains per pixel comprising a fluorinated polyimide alignment film of claim 1 wherein the alignment film is prepared from precursors consisting of 50 mole % of pyromellitic dianhydride and 50 mole % of the compound given by the structure

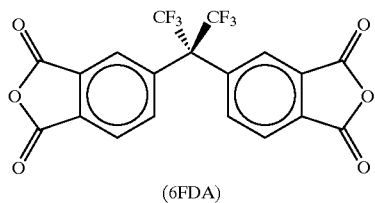
(6FDA)

or the compound given by the structure

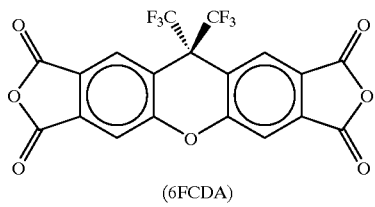
(6FCDA)

and 50 mole % of an aromatic diamine component which comprises 30 to 60 mole % of the compound given by the structure

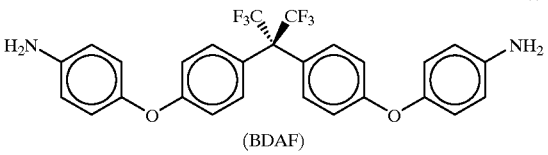
(BDAF)

and 40 to 70 mole % of 4,4'-diaminodiphenyl ether.

15. The STN LCD device having at least two domains per pixel according to claim 1 wherein the liquid crystal layer comprises a at least one compound of formula (XXVI)

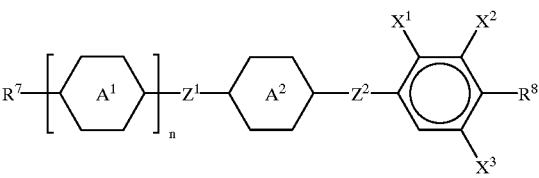

wherein $R^7$ is an alkyl group containing from 1 to 12 carbon atoms wherein, in addition, one or two non-adjacent —CH$_2$— groups can be replaced by —O—, —CO—, —COO—, —OCO— or —CH=CH—;

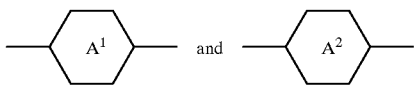

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

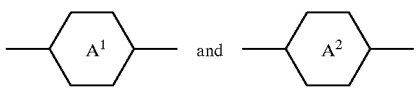

is alternatively pyrimidine-2,5-diyl, pyridine-2,5-diyl or trans-1,3-dioxane-2,5-diyl, $Z^1$ and $Z^2$ independently of one another, are a direct bond, —CH$_2$CH$_2$—, —COO—, —OCO—, —CH=CH— or —C≡C—, $X^1$, $X^2$ and $X^3$ independently of one another, are H or F, $R^8$ is the same as $R^7$ or is Q—Y, Q is —CF$_2$—, —OCF$_2$—, —C$_2$F$_4$— or a direct bond, Y is H, F, Cl or CN, and n is 0, 1 or 2.

16. An alignment film for aligning a liquid crystal layer in an LCD device comprising a fluorinated polyimide having an aromatic diamine component and an aromatic tetracarboxylic acid component or a functional derivative thereof, wherein at least one of these components comprise at least one fluorinated compound chosen from the formulae (XVI), (XVII), (XVIII), (XIX) or (XX):

(XVI) 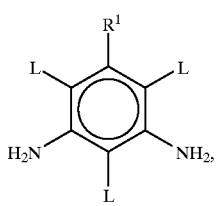

(XVII) 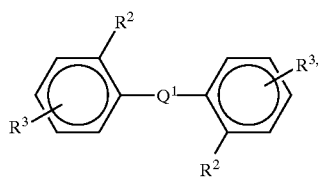

(XVIII) 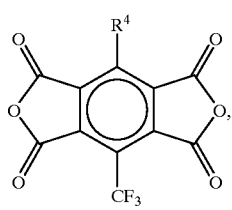

(XIX) 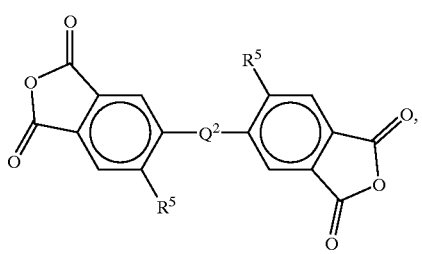

(XX) 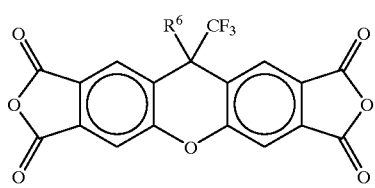

wherein

R$^1$ has the meaning of a linear or branched fluorinated alkyl group, having 1 to 16 carbon atoms, L is H or CH$_3$, R$^2$ and R$^5$ are independently of one another H, CF$_3$ or OCF$_3$, R$^4$ is H or CF$_3$, Q$^1$ has the meaning of a single bond, —O—,

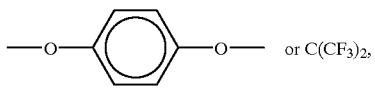 or C(CF$_3$)$_2$, with the proviso that Q$^1$ is C(CF$_3$)$_2$, when R$^2$ is H, R$^3$ is NH$_2$ or 

Q$^2$ has the meaning of a single bond or C(CF$_3$)$_2$, with the proviso that Q$^2$ is C(CF$_3$)$_2$, when R$^5$ is H, and R$^6$ is CF$_3$ or 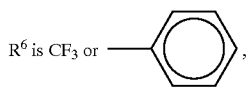, with a total amount of aromatic fluorinated diamines and fluorinated aromatic tetracarboxylic acid anhydrides or functional derivatives thereof including acid anhydrides and esters of at least 5 mole % based on the total amount of aromatic diamines and tetracarboxylic acid components comprised in the polyimide wherein the alignment film is in a LCD device having at least two domains per pixel and induces the same tilt angle of 3 to 20 degrees for liquid crystal layer in each domain of a pixel which is maintained or at least has not decreased more than 10% compared to the tilt angle of any other domain of the pixel.

* * * * *